United States Patent

[11] 3,588,398

| | | |
|---|---|---|
| [72] | Inventor | George Siviy<br>Monroeville, Pa. |
| [21] | Appl. No. | 879,190 |
| [22] | Filed | Nov. 24, 1969 |
| [45] | Patented | June 28, 1971 |
| [73] | Assignee | Westinghouse Electric Corporation<br>Pittsburgh, Pa. |

[54] SWITCHGEAR WITH POSITION INDICATING MEANS
10 Claims, 9 Drawing Figs.

[52] U.S. Cl. .................................................. 200/50
[51] Int. Cl. .................................................. H01h 9/20
[50] Field of Search........................................... 200/50.15

[56] References Cited
UNITED STATES PATENTS
2,777,024 1/1957 West .......................... 200/50.15

Primary Examiner—Robert K. Schaefer
Assistant Examiner—M. Ginsburg
Attorneys—A. T. Stratton, Clement L. McHale and W. A. Elchik ABSTRACT: Drawout-type switchgear comprises improved means providing a visual indication of the "disconnected," "test" and "connected" positions of a drawout circuit interrupting unit in a cell.

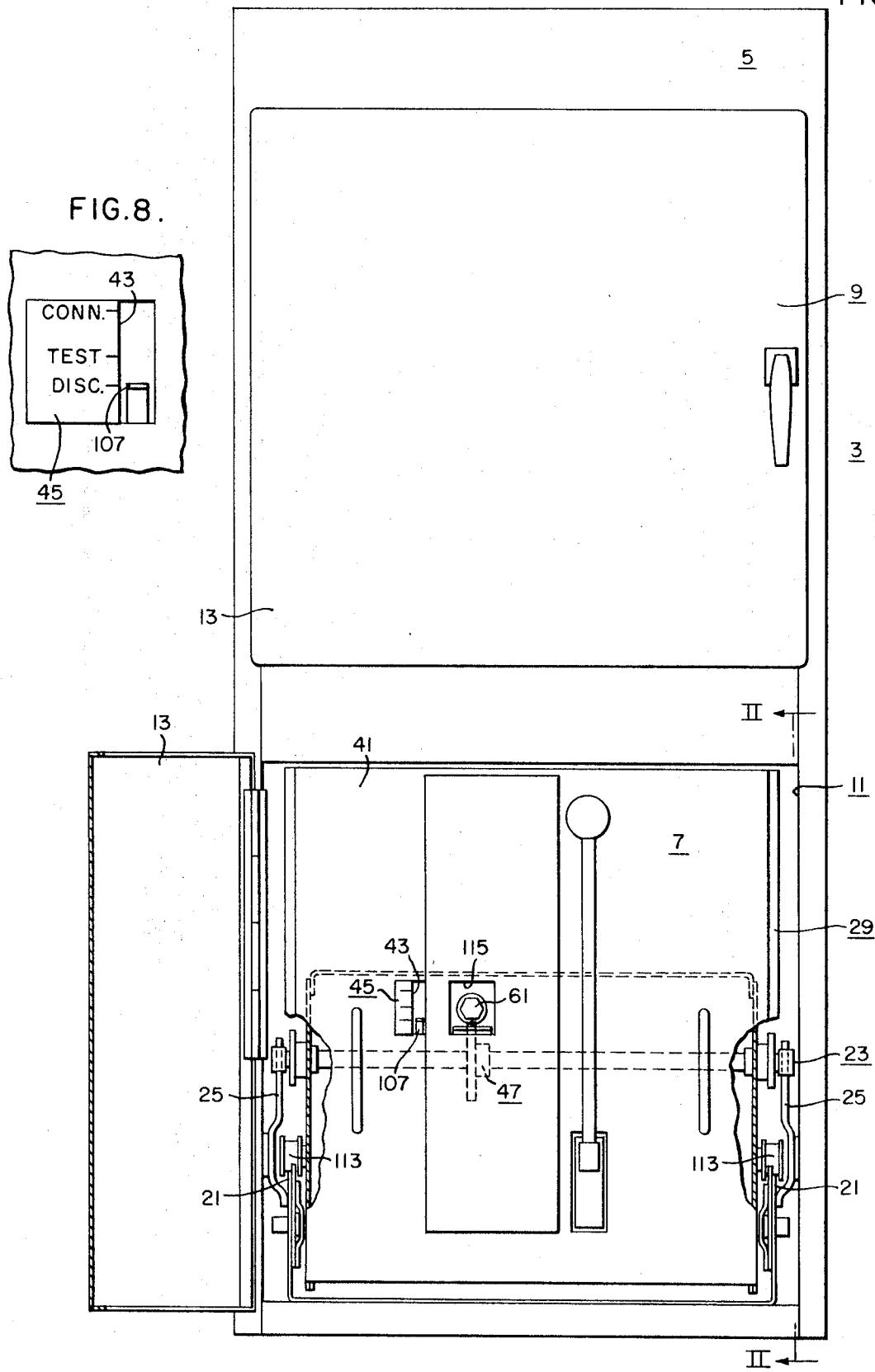
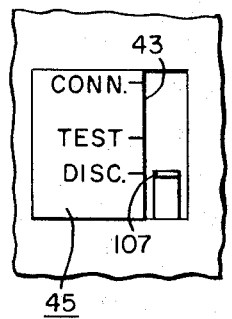

3,588,398

SWITCHGEAR WITH POSITION INDICATING MEANS

CROSS-REFERENCE TO RELATED APPLICATION

Certain parts of the structure herein disclosed are disclosed and claimed in the copending application of John L. Drown et al., Ser. No. 879,189, filed concurrently herewith.

BACKGROUND OF THE INVENTION

1. Field of the Invention

Drawout-type switchgear.

2. Description of the Prior Art

It is old in the art of metal-enclosed switchgear to provide a levering-in mechanism for levering a circuit interrupting unit into a cell, with indicating means mounted in a cooperative relationship on the circuit interrupting unit and cell structure for indicating the various positions of the circuit interrupting unit in the cell. This invention provides drawout switchgear with an an improved indicating structure that is supported solely on the circuit interrupting unit and that is visible at the front of the circuit interrupting unit to provide a visual indication of the "disconnected," "test" and "connected" positions of the circuit interrupter unit.

SUMMARY OF THE INVENTION

Improved drawout switchgear comprises a cell, having an opening at the front thereof, and a circuit interrupting unit disposed for movement within the cell. A plurality of pairs of stationary primary terminals and a stationary secondary terminal are supported in the cell. The circuit interrupting unit comprises a pair of movable primary terminals for each pole unit of the circuit interrupting unit and a movable secondary terminal. A levering-in mechanism comprises a stationary structure on the cell and a movable levering structure on the circuit interrupting unit. The stationary structure comprises a pair of slotted members that are fixedly supported on the cell. The movable levering structure comprises an operating shaft, a worm gear structure and a levering shaft having a pair of levering arms at the opposite ends thereof. The operating shaft is supported for movement about an axis that extends in the direction of movement of the circuit interrupting unit and the levering shaft is supported for movement about an axis that extends transverse to the direction of movement of the circuit interrupting unit. Upon rotation of the operating shaft, the worm gear structure is operated to rotate the levering shaft to thereby move the roller arms that cooperate with the slotted stationary members on the cell to move the circuit interrupting unit in the cell. An indicating structure that is supported solely on the circuit interrupting unit comprises an indicating member connected in a cooperative relationship with the movable levering structure and movable upon movement of the circuit interrupting unit to provide a visual indication at the front of the circuit interrupting unit of the position of the circuit interrupting unit in the cell. In the preferred embodiment, the indicating member is in an elongated indicating member pivotally supported intermediate the ends thereof with one end visible at the front of the circuit interrupting unit and the other end operatively connected, by means of a slot-and-pin cam-type connection, to a traveling nut that is threadedly mounted for axial movement on the inner end of the operating shaft. In another embodiment the indicating member is an indicating drum mounted for pivotal movement at the front of the circuit interrupting unit and operatively connected, by link means, to the levering shaft of the circuit interrupting unit.

BRIEF DESCRIPTION OF THE DRAWINGS

FIG. 1 is a front view, with parts broken away, of metal-enclosed drawout switchgear constructed in accordance with principles of this invention;

FIG. 8 is an enlarged front view of part of the front of the circuit interrupting unit seen in FIGS. 1 and 2.

DESCRIPTION OF THE PREFERRED EMBODIMENTS

Figure 9:
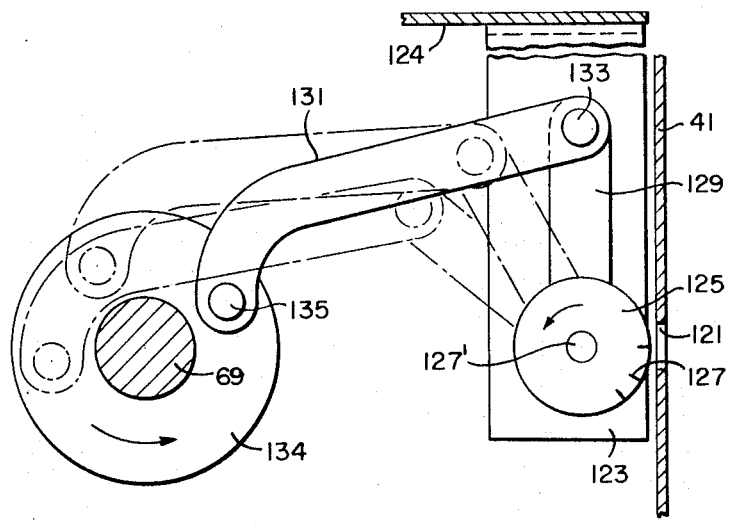
FIG. 9 is a partial side sectional view illustrating another embodiment of this invention.

Referring to the drawings, there is shown, in FIG. 1, metal-enclosed switchgear 3 comprising an enclosure 5 and a drawout-type circuit interrupting unit 7. The enclosure 5 comprises sheet-metal and supports formed to provide a plurality of cells or compartments, two of which are disclosed at 9 and 11. Each of the cells 9, 11 is provided with an opening at the front thereof. Doors 13 are supported on the enclosure 5 for movement between open and closed positions to provide access to the circuit interrupting units in the cells. In each cell, at the back part thereof opposite the front opening of the cell, there are a pair of stationary primary terminals 15, 17 for each pole unit of the associated circuit interrupting unit. There is also a stationary secondary terminal supported at the back of each cell. In each cell, there are a pair of tracks 21, that provide a track structure in a manner to be hereinafter disclosed, and a stationary levering structure 23 comprising a pair of stationary slotted plates 25 supported in the enclosure 5.

Figure 4:
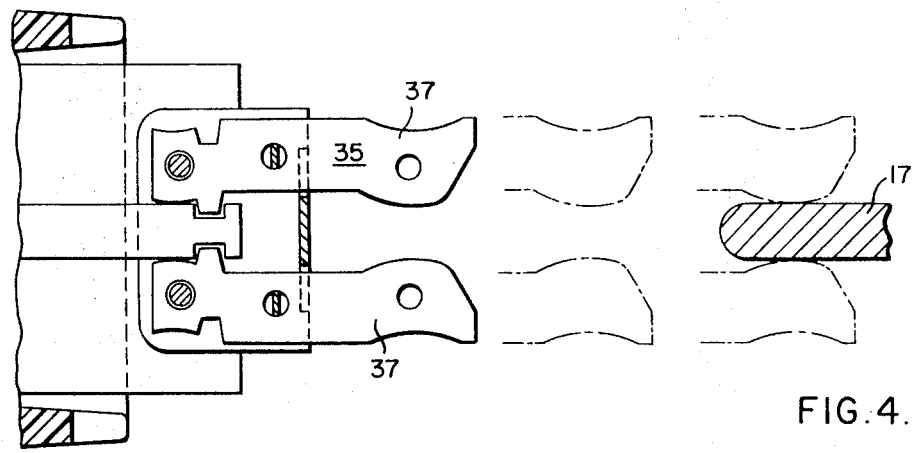
FIG. 4 is a partial sectional view taken generally along the lines IV-IV of FIG. 2.

The circuit-interrupting unit 7 is a circuit breaker of the type more specifically described in the patent application of Fred Bould et al. entitled "Circuit Breaker," Ser. No. 770,296 filed Oct. 24, 1968, and assigned to the assignee of the subject application. The circuit breaker 7 comprises a support structure 29 and a multipole circuit-breaker mechanism supported on the support structure 29. The circuit-breaker mechanism may be any of a well-known type comprising a pair of cooperable contacts for each pole of the breaker and an operating mechanism operable to simultaneously open and close the contacts of all of the poles. A movable secondary terminal 31 is fixedly supported on the support structure 29 of the circuit breaker 7 for cooperation with the stationary secondary terminal 19 in a manner to be hereinafter disclosed. A pair of movable primary terminals 33, 35, for each pole unit of the breaker 7 are fixedly supported on the support structure 29 of the circuit breaker 7 for cooperation with the stationary primary terminals 15, 17 in a manner to be hereinafter described. Each pair of movable primary terminals 33, 35 cooperates with the associated pair of stationary primary terminals 15, 17, to connect and disconnect the associated pole-unit contacts in an electric circuit in a manner well known in the art. As is illustrated in FIG. 4, each of the stationary primary terminals 15, 17 is a stab-type conductor and each of the movable primary terminals 33, 35 comprises a plurality of contact fingers 37 biased toward each other to clip onto the associated stab-type stationary primary terminal when the movable primary terminal is moved into the connected position shown in broken lines in FIG. 4.

The support structure 29, of the circuit breaker 7, comprises a pair of sideplates 39 (FIGS. 2 and 3) and a front plate 41. The front plate 41 has a window opening 43 (FIGS. 1 and 8) therein, and an indicating plate 45 thereon opposite the opening 43 for providing a visual indication of the positions of the circuit breaker 7 in a manner to be hereinafter described.

The switchgear 3 comprises a levering-in mechanism 23 (FIG. 1) that comprises the stationary structure 25 supported on the enclosure 5 and a movable levering structure 47 supported on the circuit breaker or circuit interrupting unit 7. The movable levering structure 47 (FIG. 3) comprises an operating shaft structure 49 rotatably supported on a pair of support plates 51 that are supported on a pair of support plates 53. The plates 51, 53 are part of the support structure 29 of the circuit interrupting unit. The operating shaft 49 is supported in a tubular support member 55 that receives a portion of the shaft 49 and that is welded or otherwise fixedly supported on one of the support plates 51. The support 55 comprises a surface that engages a shoulder 57 of the shaft 49 at one end thereof and a shoulder 59 of the shaft 49 at the other end thereof to prevent axial movement of the operating shaft 49. The operating shaft 49 comprises a hexagonal front part 61, for receiving a tool that may be used to crank the shaft 49, a worm 63 intermediate the ends thereof and a threaded part 65 at the back end thereof. The worm 63 cooperates with a gear 67 that is fixedly secured to a levering shaft 69. The levering shaft 69 is supported on the support plates 53 and the sideplates 39 for rotational movement. The ends of the levering shaft 69 extend out through openings in the sideplates 39 and a pair of roller arms 71 are fixedly secured to the opposite ends of the levering shaft 69. Each of the roller arms 71 has a roller 73 rotatably supported on a pin 75 that is fixed to the associated roller arm 71. A stop pin 77 is fixedly supported on one of the sideplates 39 to engage the associated roller arm 71 to limit movement of the levering shaft 69 in one direction. A hexagonal traveling stop nut 79 is supported on the threaded portion 65 of the operating shaft 49. The nut 79 is supported just under a plate 81 that is a part of the breaker support structure 29, with one flat face of the hexagonal nut 79 engaging the flat under surface of the plate 81 to prevent rotational movement of the nut 79 when the operating shaft 49 is rotated. The nut 79 moves axially on the threaded portion 65 sliding against the under surface of the plate 81 as the operating shaft 49 is rotated. The nut 79 is provided with a slot 83 that receives a spring clip 85. The spring clip 85 comprises an annular portion fitting within the slot 83. The clip 85, at one end 87 thereof, extends through a slot 89 in the plate 81. The other end 91 of the spring clip 85 extends through a slot 93 in one end of an elongated indicating member 95. With the spring clip 85 positioned in the slot 83 of the nut 79 and with the opposite ends of the spring clip 85 positioned in the slots 89, 93, the spring clip 85 moves axially with the nut 79 to operate the indicating member 95 as the operating shaft 49 is rotated. The elongated indicating member 95 is pivotally supported, intermediate the ends thereof, on a pin 101 that is secured to one of the plates 53, and a torsion spring 103 biases the indicating member 95 in a clockwise direction, which movement is limited by the engagement of the pin part 91 of the spring clip 85 in the slot 93. The torsion spring 103 is provided to take up any loose or slack movement between the spring clip 85 and the indicating member 95 to provide a more positive indication of the position of the circuit breaker in the cell. The indicating member 95, at the other end thereof, comprises a bent over indicating projection 107 that is disposed at the opening 43 (FIGS. 1 and 8) in the front plate 41 to provide a front visual indication of the position of the indicating member 95 to thereby provide a front visual indication of the position of the circuit breaker 7 in the cell 11.

Figure 2:
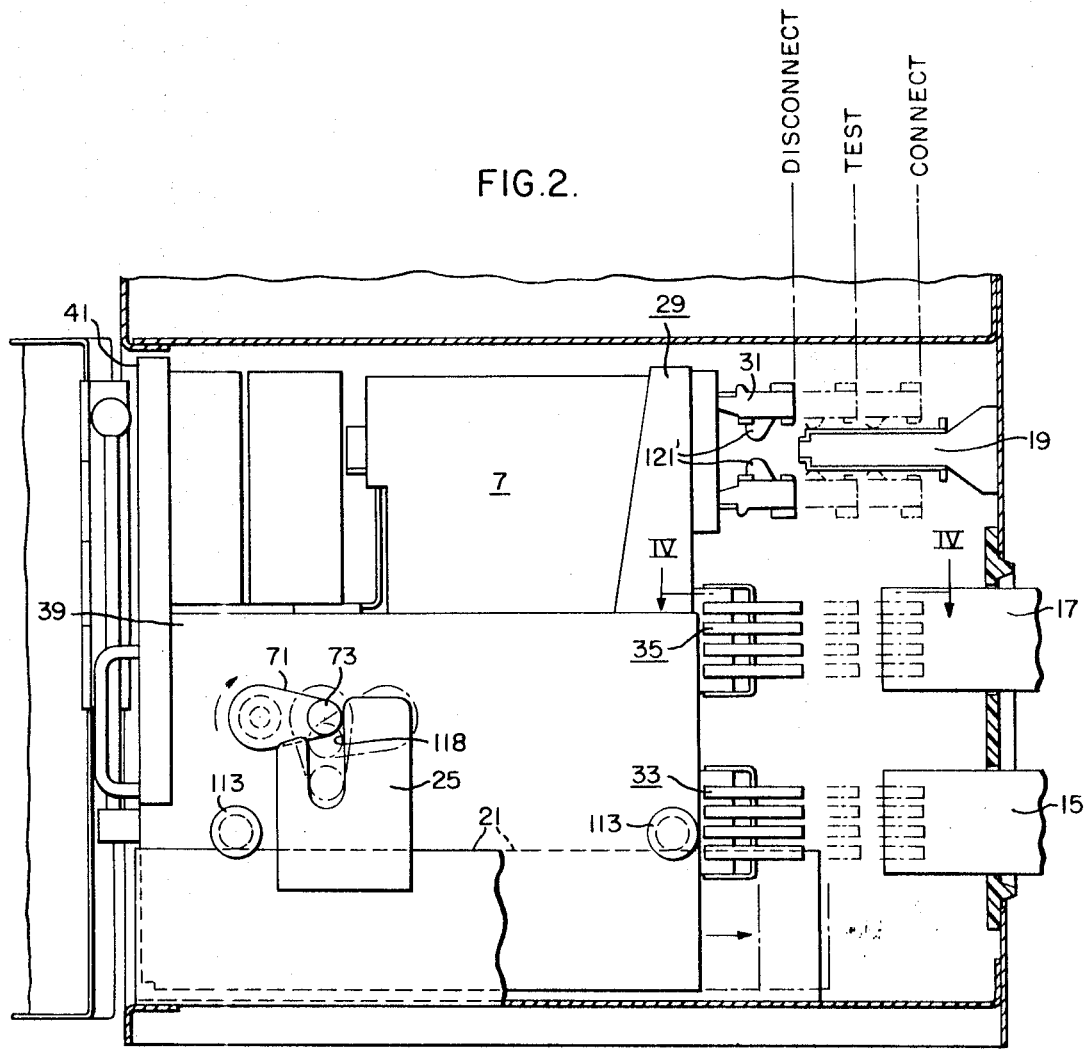
FIG. 2 is a sectional view taken generally along the line II-II of FIG. 1.
Figure 3:
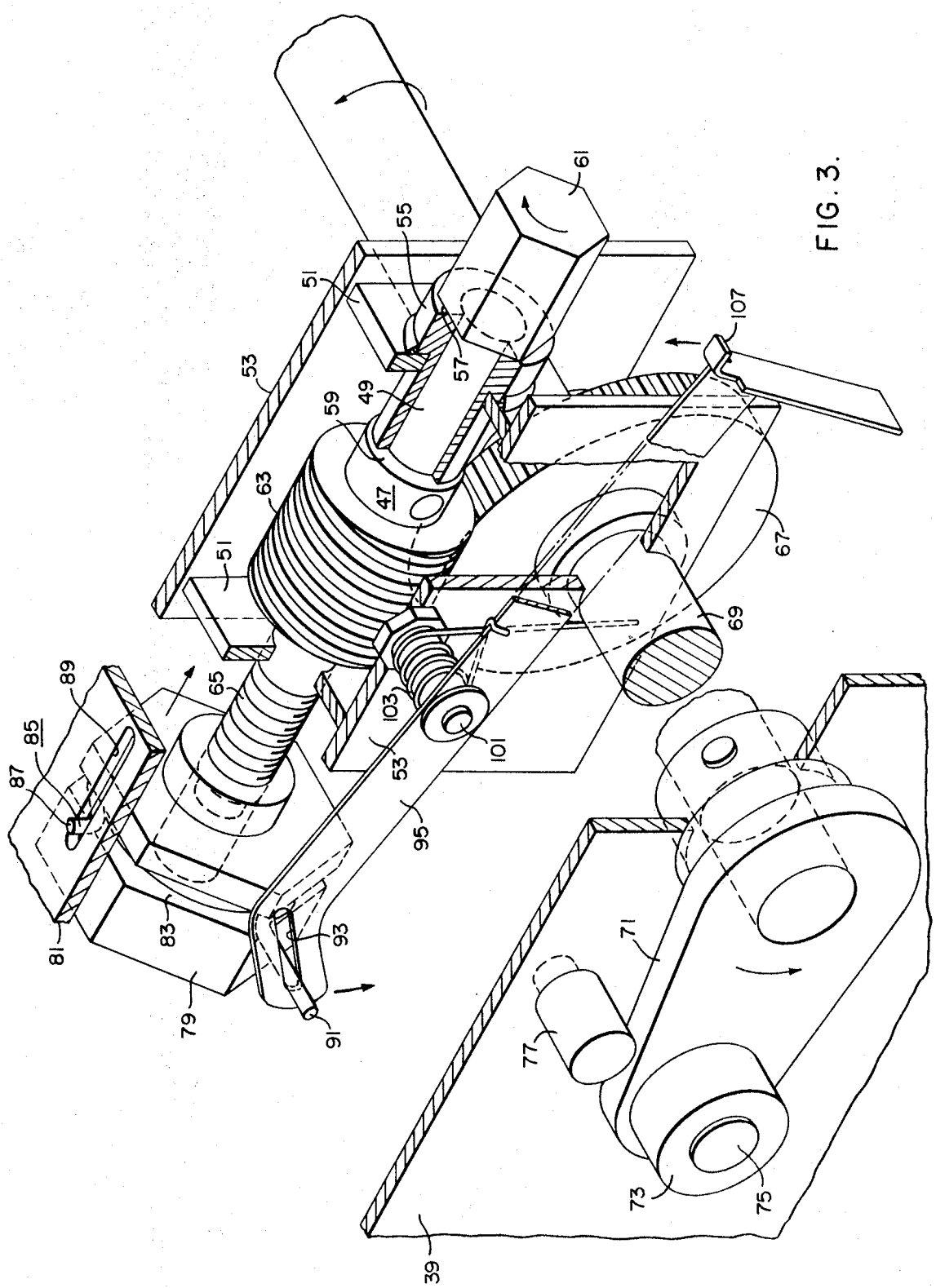
FIG. 3 is a perspective view, with parts broken away, illustrating the levering-in mechanism and position indicating structure of the switchgear disclosed in FIGS. 1 and 2.

The circuit interrupting unit or circuit breaker 7 is shown in FIGS. 1—5 in the disconnected position. As can be seen in FIG. 2, in the disconnected position of the circuit interrupting unit 7 the movable primary terminals 33, 35 are disengaged from the stationary primary terminals 15, 17 and the movable secondary terminal 31 is disengaged from the stationary secondary terminal 19. In this position, the traveling nut 79 (FIGS. 3 and 5) is in an axial position such that the pin 91, in the slot 93 of the indicating member 95, positions the indicating member 95 such that the indicating projection 107 is in the lower position wherein the projection 107, in the opening 43 (FIG. 8), is opposite the "Disc" indicia on the front plate 41 which indicia means that the circuit interrupting unit 7 is in the disconnected position. As can be understood with reference to FIGS. 1 and 2, two pairs of rollers or wheels 113 are rotatably mounted on the sideplates 39 of the circuit interrupting unit 7 with the wheels 113 engaging the tracks 21 of the enclosure 5 to support the circuit interrupting unit 7 for rectilinear movement in the associated cell 11 of the enclosure 5. The front panel 41 (FIG. 1) of the circuit interrupting unit 7 is provided with an opening 115 to provide access to the hexagonal front part 61 of the operating shaft 49 when the door 13 of the cell 11 is in the open position. With the door 13 in the open position, a crank tool can be applied to the hexagonal part 61 of the operating shaft 49 and the operating shaft 49 can be manually rotated in a clockwise (FIGS. 1 and 3) direction to lever the circuit interrupting unit 7 into the cell 11. Upon clockwise rotation of the operating shaft 49, the worm 63, operating against the gear 67, rotates the levering shaft 69 in a counterclockwise (FIG. 3) direction. Because of the different views illustrated in FIGS. 2 and 3, the levering shaft 69, upon levering-in rotation thereof, moves in a clockwise direction as shown in FIG. 2. Upon levering-in rotation of the levering shaft 69, the roller arms 71 move the rollers 73 in slots 118 (FIG. 2) in the stationary members 25 with the rollers 73 engaging surfaces of the stationary members 25 to draw the circuit interrupting unit 7 inward (to the right) as seen in FIG. 2. During this movement of the circuit interrupting unit 7, a pair of spring-biased contacts 121 (FIG. 2) of the movable secondary terminal 31 engage opposite conducting surfaces of the stationary secondary terminal 19 in the intermediate or test position indicated in FIG. 2. In this position, the movable primary terminals 33, 35 are disengaged or disconnected from the stationary primary terminals 15, 17 and the movable secondary terminal 31 is engaged or connected with the stationary secondary terminal 19 to connect the various control components of the circuit interrupting unit in a test circuit so that an operator can test the operation of the circuit interrupting unit 7 without energizing the circuit to be controlled by the circuit interrupting unit 7. Upon further rotation of the operating shaft 49, the rollers 73 (FIG. 2) operating in the slots 118 of the stationary members 29, force the circuit interrupting unit 7 into the connected position illustrated in broken lines in FIG. 2. In the connected position, the movable secondary terminal 31 is connected with the stationary secondary terminal 19 and each pair of movable primary terminals 33, 35 is connected with the associated pair of stationary primary terminals 15, 17. As can be understood with reference to FIG. 4, each of the movable primary terminals 35 comprises a plurality of contact fingers 37 that are biased toward each other and that clip on to the associated stab-type stationary primary terminal conductor 17.

When it is desired to withdraw the circuit interrupting unit 7, the operating shaft 49 is rotated in a counterclockwise (FIGS. 1 and 3) direction to rotate the levering shaft 69 clockwise (FIG. 3) to move the rollers 73 on the roller arms 71 in the slots 118 of the stationary members 25 to force the circuit interrupting unit 7 from the connected position to the test position and then from the test position to the disconnected position seen in full lines in FIG. 2. Rotation of the operating shaft 49 is stopped in the disconnected position when the one roller arm 71 engages the stop member 77. Rotation of the operating shaft 49 is stopped in the connected position by the engagement of the operating shaft 49 with a shoulder on the traveling nut 79, to bind the operating shaft 49 and nut 79 for unitary movement, and engagement of the one flat face of the traveling nut 79 with the plate 81 in a manner described in the above-mentioned copending application of John L. Drown et al. Ser. No. 879,189.

Figure 7:
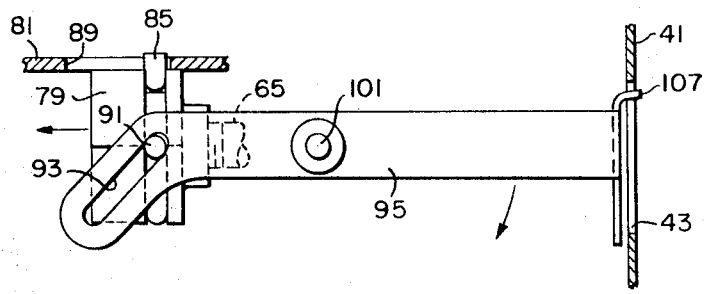
FIGS. 5, 6 and 7 are side sectional views illustrating the positions of the indicating structure of the switchgear illustrated in FIGS. 1-3.
Figure 6:
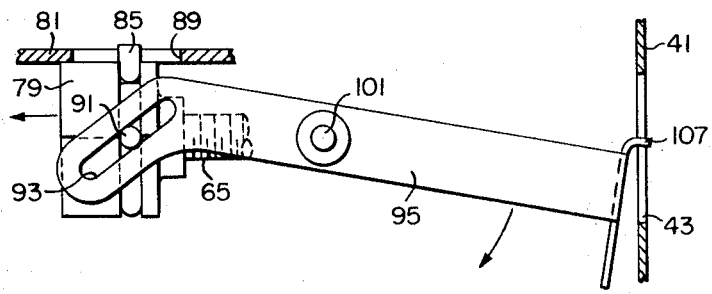
Figure 5:
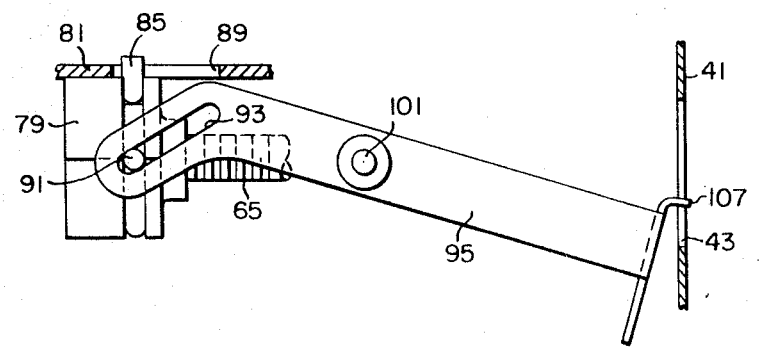

Referring to FIGS. 5—7, it will be understood that with the nut 79 supported on the threaded portion 65 of the operating shaft 49, and with the top flat face of the hexagonal nut 79 engaging the undersurface of the plate 81 to prevent rotation of the nut 79 as the operating shaft rotates, rotation of the operating shaft 49 to lever the circuit interrupting unit 7 in the direction toward the disconnected position will move the nut 79 axially to the left (FIGS. 5—7) and rotation of the operating shaft 49 in the direction toward the connected position will move the nut 79 axially to the right on the threaded part 65 (FIGS. 5—7). As the nut 79 moves axially on the threaded part 65, the upper flat face of the nut 79 slides against the undersurface of the plate 81. As the nut 79 moves to the right from the disconnected position seen in FIG. 5 to the test position seen in FIG. 6, the pin part 91 of the spring clip 85, in the slot 93 of the indicating member 95, cams the indicating member 95 in a counterclockwise direction to move the indicating projection 107 from the lower position (FIG. 8) to the intermediate position to indicate that the circuit interrupting unit is in the test position. As the circuit interrupting unit is moved into the connected position, the pin part 91 of the spring clip 85 cams the indicating member 95 to move the indicating member 95 counterclockwise to the connected position seen in FIG. 7 wherein the indicating projection 107 is in the upper position (FIG. 7) opposite the connected (conn.) indication shown at FIG. 8. Upon reverse movement of the circuit interrupting unit 7, the traveling nut 79 moves to the left (FIGS. 5—7) and the pin 91 of the spring clip 85, operating in the slot 93 of the indicating member 95, cams the indicating member 95 from the connected position seen in FIG. 7 to the test position seen in FIG. 6 and upon further movement of the circuit interrupting unit 7 to the disconnected position, the pin 91, operating in the slot 93, moves the indicating member 95 to the lower or disconnected position seen in FIGS. 1—5 and 8. During assembly of the circuit breaker in the associated cell 11, the assembler can select any of the six flat faces of the hexagonal nut 79 to engage the undersurface of the plate 81 to provide an adjustment of the coordination between the position of the indicating member 95 and the position of the circuit interrupting unit in the cell. The indicating member 95 and movable levering structure 47 (FIG. 3) are all mounted on the circuit interrupting unit 7 as part of the circuit interrupting unit 7 to facilitate easy assembly of the switchgear and to provide accurate adjusted coordination between the indicating member 95 and the movable levering-in structure 47.

Another embodiment of the invention is shown in FIG. 9. As can be seen in FIG. 9, the front plate 41 of the circuit interrupting unit 7 is provided with an opening 121 therein. A support plate 123 is fixedly secured to a plate 124 that is part of the breaker support structure 29. An indicating drum 125 is provided with indicia 127 at the front thereof to identify the "disconnected," "test" and "connected" positions of the circuit interrupting unit 7. The indicating drum 125 is mounted on the plate 123 for movement about the pivot pin 127. A link 129, extending upward from the pin 127, is fixed to rotate with the indicating drum 125. Another link 131 is pivotally connected at one end thereof to the part 129 by means of a pin 133. The link 131 is pivotally connected at the other end thereof to a link support 134, that is fixed on the levering shaft 69 to rotate with the shaft 69, by means of a pivot pin 135. It can be understood that as the levering shaft 69 moves to move the circuit interrupting unit 7 in the associated cell, the link 131 will be moved to pivot the part 129 and indicating drum 125 in relation to the movement of the circuit interrupting unit 7 in the cell so that the "disconnected," "test" and "connected" positions of the circuit interrupting unit 7 will be visible, by means of the indicia 127 on the drum 125, through the opening 121 in the front plate 41.

I claim:

1. Drawout switchgear comprising a cell having an opening at the front thereof, stationary primary terminal means supported in said cell, stationary secondary terminal means supported in said cell, a circuit interrupting unit disposed for movement in said cell, movable primary terminal means on said circuit interrupting unit movable with said circuit interrupting unit, movable secondary terminal means on said circuit interrupting unit movable with said circuit interrupting unit, a levering-in mechanism comprising a stationary structure on said cell and a movable levering structure on said circuit interrupting unit, said movable levering structure comprising an operating shaft rotatable about an axis that extends generally in the direction of movement of said circuit interrupting unit in said cell to operate said movable levering structure whereupon said movable levering structure coacts with said stationary structure to force said circuit interrupting unit between a disconnected position and an intermediate test position and between said intermediate test position and a connected position, in said disconnected position said movable primary terminal means being disengaged from said stationary primary terminal means and said movable secondary terminal means being disengaged from said stationary secondary terminal means, in said test position said movable primary terminal means being disengaged from said stationary primary terminal means and said movable secondary terminal means being engaged with said stationary secondary terminal means, in said connected position said movable primary terminal means being engaged with said stationary primary terminal means and said movable secondary terminal means being engaged with said stationary secondary terminal means, an indicating structure supported solely on said circuit interrupting unit, said indicating structure comprising a movable indicating member having an indicating part thereon visible at the front of said circuit interrupting unit, means connecting said movable indicating member in a cooperative relationship with said movable levering structure such that said movable levering structure moves said indicating member to position said indicating part at "disconnected" "test" and "connected" positions visible at the front of said circuit interrupting unit corresponding to the "disconnected" "test" and "connected" positions of said circuit interrupting unit.

2. Drawout switchgear according to claim 1, said indicating member being an elongated indicating member pivotally supported intermediate the ends thereof on said circuit interrupting unit, said indicating part being disposed at one end of said indicating member on one side of the pivotal support, and said movable levering structure operating against said indicating member on the other side of the pivotal support to pivot said indicating member to the indicating positions corresponding to the positions of said circuit interrupting unit.

3. Drawout switchgear according to claim 2, said indicating member pivotally moving about an axis normal to the direction of movement of said circuit interrupting unit, and said connecting means being a lost-motion cam-type connecting means between said movable levering structure and said indicating member.

4. Drawout switchgear according to claim 3, said operating shaft having a threaded part thereon, a nut member threadedly mounted on said threaded part, means preventing rotation of said nut member with said operating shaft and permitting axial movement of said nut member on said operating shaft whereby said nut member moves axially as said operating shaft is rotated, said lost-motion cam-type connecting means operatively connecting said nut member with said indicating member to pivot said indicating member upon axial movement of said nut member.

5. Drawout switchgear according to claim 4, a pin movable with said nut member, said indicating member having an elongated slot therein, said pin being positioned in said elongated slot whereby upon axial movement of said nut member said pin operating in said elongated slot cams said indicating member to move said indicating member to the indicating positions thereof.

6. Drawout switchgear according to claim 1, said operating shaft comprising a threaded part, a nut threadedly mounted on said threaded part, means preventing rotation of said nut with said operating shaft and permitting axial movement of said nut on said operating shaft whereby said nut moves axially as said operating shaft is rotated, and connecting means connecting said indicating member in a cooperative relationship with said nut such that axial movement of said nut moves said indicating member to the indicating positions thereof.

7. Drawout switchgear according to claim 6, a pin movable with said nut, said indicating member having an elongated slot therein, said pin being disposed in said elongated slot to cam said indicating member to the indicating positions thereof as said nut moves axially on said operating shaft.

8. Drawout switchgear according to claim 7, said indicating member being an elongated member pivotally supported intermediate the ends thereof, said indicating member comprising said indicating part on one side of the pivot thereof at one end thereof visible at the front of said circuit interrupting unit, and said slot in said indicating member being positioned on the other side of the pivot thereof in proximity to the other end of said indicating member.

9. Drawout switchgear according to claim 1, said movable levering structure comprising a levering shaft structure rotatable about a second axis transverse to the direction of movement of said circuit interrupting unit, gear means connecting said operating shaft with said levering shaft structure, said indicating structure comprising an indicating member supported on said circuit interrupting unit for pivotal movement about a third axis parallel to said second axis, said indicating member being visible at the front of said circuit interrupting unit, and link means connecting said levering shaft structure with said indicating member.

10. Drawout switchgear according to claim 9, said link means comprising a link member pivotally connected at one end thereof to move said indicating member and pivotally connected at the other end thereof to move with said levering shaft structure.